2,738,487
SONIC DEPTHOMETER

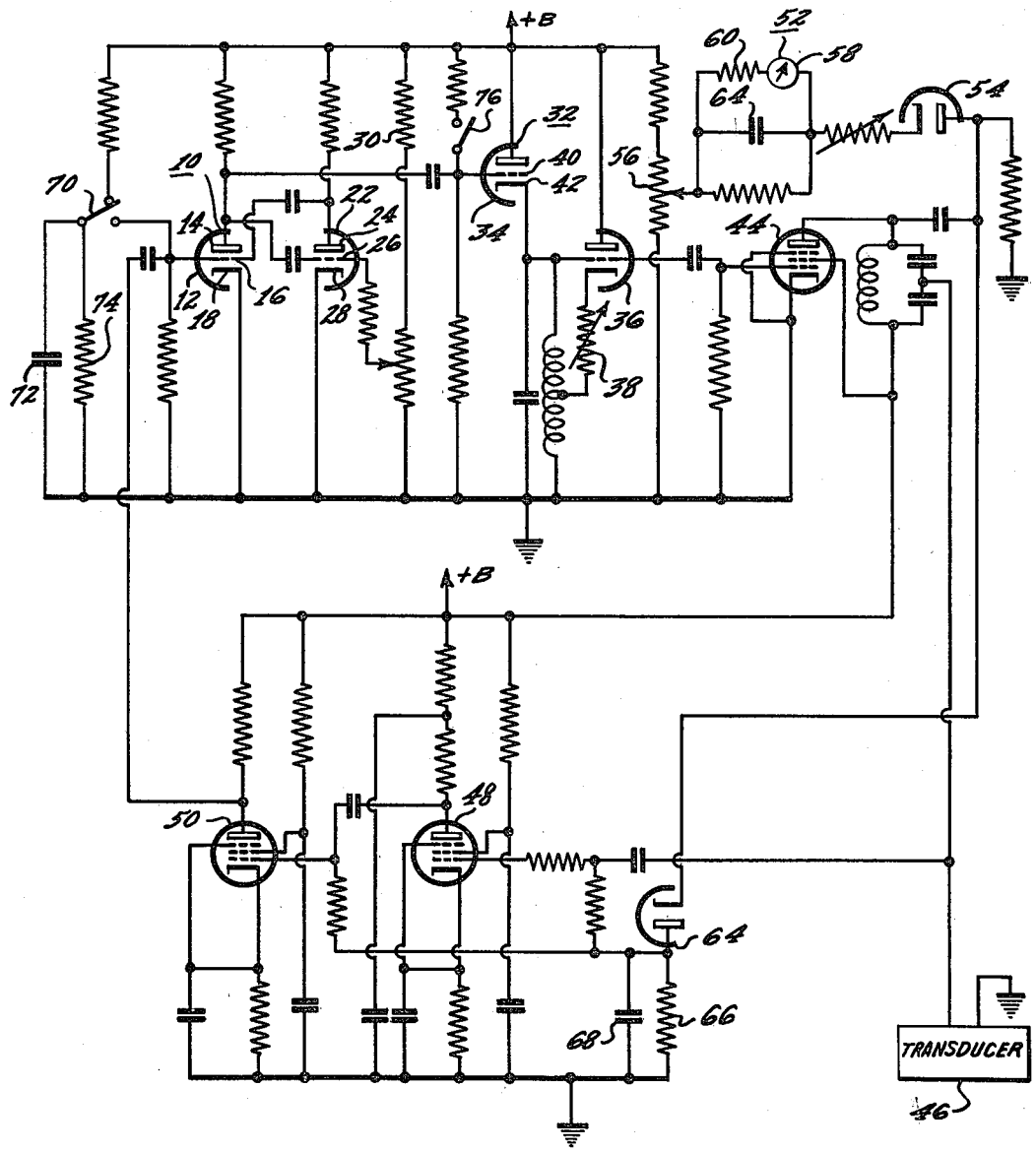

Reginald A. Hackley, Princeton, and Edward S. Rogers, Trenton, N. J., assignors to Radio Corporation of America, a corporation of Delaware Application December 22, 1950, Serial No. 202,212

3 Claims. (Cl. 340—3)

The present invention relates to apparatus for measuring the distance to a surface by the transmission of compressional wave energy toward the surface and the reception of compressional wave energy reflected from the surface and more particularly is an improvement in such apparatus used for determining the depth of a body of water.

When shallow depths of water, which are less than about 50 feet, are measured using shock excited depth apparatus of the conventional type, difficulty is experienced in obtaining an accurate reading. This is due to the fact that in the shock excited type of depth apparatus the single transducer used must have a high Q. Therefore, after an initiating pulse is applied to the transducer it remains in a state of vibration for a considerable time (depending on the effective Q). If the water is shallow enough so that the reflected sound energy arrives at the transducer before the initial vibration has ceased, the device fails to give a depth reading. A feature of the present invention is that a low Q transducer is used and the pulse length is made short enough so that the transducer is no longer energized by the time the reflected sound pulse arrives.

An object of the present invention is to provide improved depth measuring apparatus wherein the frequency of occurrence of transmitted pulses is determined by the depth of the water.

Another object of the present invention is to provide improved depth measuring apparatus wherein depth indication is obtained from the transmitter output.

Still another object of the present invention is to provide shallow depth measuring apparatus which is reliable.

A further object of the invention is to provide an improved depth measuring apparatus which is simple, compact and inexpensive.

These and other objects of the invention are achieved by providing sonic depth measuring apparatus wherein a pulsed oscillator generates a short pulse of electrical energy at the desired frequency. This pulse, after amplification, is applied to a transducer. The transducer transforms the pulse to acoustical energy and radiates it into the water. This energy travels to the bottom where it is reflected back to the transducer which transforms it back to electrical energy. The transducer output is applied to a receiving amplifier where it is raised to a level sufficient to trip a monostable multivibrator circuit. This action causes the pulsed oscillator to generate another short pulse of electrical energy and the operating cycle is repeated. The receiving amplifier is biased off during the transmission period by a portion of the output of the transmitter amplifier. Since the number of pulses transmitted is inversely proportional to the depth of the water, a meter circuit sensitive to the number of transmitted pulses and calibrated in water depth may be fed from the constant output level transmitter amplifier. The transmitted energy pulse is made short enough so that in the shallowest water depth to be measured, the transducer is no longer energized by the time the reflected sound pulse impinges upon its active surface.

The novel features of the invention, as well as the invention itself, both as to its organization and method of operation, will best be understood from the following description, when read in connection with the accompanying drawing, which shows a circuit diagram of an embodiment of the invention.

Referring to the drawing, there may be seen a monostable multivibrator circuit 10 of the two-triode type well known in the art. This consists of two triode tubes 12, 22, in the same envelope if desired, wherein the anodes 14, 24 in each tube are cross-connected by condensers to each other's grids 16, 26. Bias, applied to the grid of the right hand one of the triodes 26, is derived from a voltage divider 30 across the supply of operating potential. This bias serves to maintain conduction in the right-hand triode 22 except for the time during which the left-hand triode 12 is made to conduct by the application of a positive pulse to its grid 16. As soon as the pulse is removed from the left-hand tube grid 16, the multivibrator circuit 10 returns to its stable condition, with conduction in the right-hand tube, within a period determined by the time constants of the components used in the circuit.

A twin triode and its tank circuit constitutes a pulsed oscillator 32. The right-hand half of this twin triode 36 and its tank circuit 38 is a Hartley type of oscillator, well known in the art, which, when operating, generates oscillations at a desired frequency. The left-hand half 34 of the twin triode is a variable impedance device which serves to pulse the oscillator. The cathode 42 of this tube is connected to the tank circuit 38 and its grid 40 is connected to the anode 14 of the left hand tube 12 of the monostable trigger circuit 10. When the variable impedance tube 34 is conducting, its cathode impedance is in parallel with the tank circuit circuit 38. This serves to lower the Q of the tank circuit to such an extent that oscillations by the oscillator tube 36 cannot take place. When the variable impedance tube is not conducting the Q of the tank circuit is raised to such an extent that the oscillator tube goes into oscillation.

Since the grid 40 of the variable impedance tube 34 is connected to the anode 14 of the left hand triode 12 of the monostable circuit 10, its condition of conduction is determined by the condition of the monostable circuit. In the stable condition of the monostable circuit, with conduction in the right hand triode 22, the variable impedance tube 34 is conductive and the oscillator tube 36 is prevented from oscillating. Upon the application of a positive pulse to the left hand monostable circuit tube grid 16, it is made conductive and the negative pulse generated at its anode 14 cuts off conduction in the variable impedance tube 34, thus permitting the generation of oscillations for the duration of the pulse. The time constants of the monostable circuit as well as the condenser coupling the monostable circuit to the variable impedance tube and the variable impedance tube grid resistor are selected to make the duration of the negative pulse short enough so that the projecting transducer is not excited or subject to mechanical ringing when a reflected sound pulse is received.

The oscillation generator output is applied to a power amplifier 44 for amplification and application to a transducer 46. The transducer 46 may be any of the well known crystal or nickel stack type and serves both to convert the electrical energy pulse to acoustical energy and to project this energy downward into the water, and to receive the acoustical energy reflected from the bottom and convert it back to electrical energy. The electrical output from the transducer 46 is applied to the receiver which consists of two receiver amplifiers 48, 50 in cascade which serve to sharpen and amplify the electrical pulse received until its amplitude is sufficient to trip the monostable multivibrator circuit 10 to its unstable condition. This in turn permits the oscillator to generate another short pulse which is projected into the water, reflected from the bottom and received to be used to trigger the oscillator once more.

It will be readily appreciated, that the number of pulses of electrical energy generated by the transmitter oscillator within a given time interval varies inversely with the depth of the water, since the time of travel of the projected acoustical energy varies with the depth of the water. Therefore, a metering circuit 52 which is sensitive to the number of transmitted pulses may be used and calibrated in water depth. The metering circuit 52 consists of a diode 54 which is connected to derive a portion of the transmitting amplifier output. The rectified output of the diode 54 is applied to a network of resistors and a condenser whose values are selected to maintain the meter reading proportional to the number of pulses impressed upon the network. The metering circuit terminates in a potentiometer 56 fed from the operating potential supply. This is to adjust the zero current end of the scale and to compensate for the contact potential current of the diode 54. The time constant of the meter 58 is adjusted by means of the resistor 60 in series with it and the parallel capacitor 62 so that the meter provides a steady indication. The meter itself may be a D. C. milliammeter of appropriate range and calibration. Since the meter circuit 52 is sensitive to amplitude changes, if it were fed from the receiver it would be necessary to hold the receiving amplifiers 48, 50 at a fixed level, regardless of the water depth or the reflecting characteristics of the bottom in order to make measurements from the receiving side of the system. By connecting the indicating circuit to the transmitter amplifier 44 whose output is always at a constant level, the sole function of the receiving system is to initiate the next outgoing pulse upon receipt of an incoming pulse.

Another diode 64 is coupled between the output of the transmitting amplifier and the grids of the receiving amplifiers. This diode together with its associated resistor 66 and condenser 68 serves to apply some of the transmitter output to the receiving amplifiers as a negative bias so that they are biased off while the transmitter oscillator is operating. This insures that the length of the generated pulse depends on the constant of the monostable circuit since, as soon as the transmitter starts to furnish an output, the receiver is cut off and the monostable circuit starts to return to its stable condition which cuts off the transmitter.

In order to start the system operating a switch 70 is operated momentarily. This switch 70 serves, in its unoperated condition to charge a condenser 72. In its operated condition the condenser 72 applies a positive pulse to the monostable multivibrator circuit 10 and causes it to be operated to its unstable condition. The transmitting oscillator then oscillates and starts the cycle of operation. The condenser 72 and its parallel resistor 74 have their values chosen so that even if the switch 70 is held depressed the charge on the condenser is dissipated before the slideback circuit is tripped by the received reflected pulse. To stop the operation of the system a switch 76 connected to the grid of the variable reactance tube 34 is operated. This applies positive bias to the grid of the variable reactance tube, thus holding it operated against the next tripping action of the slideback circuit.

In selecting the operating frequency and the transducer for use in this system, several factors should be given consideration. The transducer should be relatively compact, rugged and efficient and should have a low Q. The receiving sensitivity should be high in order to limit the amount of gain required in the receiving system. The directional pattern should be sharp enough to concentrate the radiated power toward the bottom, but not so sharp that the returned echo will be missed, due to the rolling and pitching of the vessel on which the equipment is operating. Since the embodiment of the invention is designed for use in fairly shallow water, an operating frequency of 500 k. c. would appear to be suitable. By using a frequency on this order the desired directional pattern can be obtained with a relatively small radiator. A transducer having a barium titanate active element should meet the requirements for the transducer.

As described above, the meter scale is substantially linear and the calibration will show more shallow depths at the top of the scale and less shallow depths at the bottom of the scale. A logarithmic scale therefore may be more desirable so that greater accuracy may be obtained at more shallow depths. This can be accomplished by inserting a tube having logarithmic characteristics between the diode and the D. C. meter.

From the foregoing description, it will be readily apparent that we have provided an improved system or apparatus for measuring the depth of water underneath a ship. Although only a single embodiment of our invention has been shown and described herein, it should be apparent that many changes may be made in the embodiment herein disclosed, and that many other embodiments are possible, all within the spirit and scope of our invention. Therefore, it is desired that the foregoing description shall be taken as illustrative and not as limiting.

What is claimed is:

1. A pulsed depth meter system comprising an oscillator, pulse producing means for generating a short electrical pulse in response to the application of a pulse thereto, means coupling said pulse producing means and said oscillator to prevent said oscillator from oscillating when said pulse producing means is not producing a pulse and to permit said oscillator to oscillate when said pulse producing means is producing a pulse, an electroacoustic transducer coupled to be driven by an output from said oscillator, a receiver coupled to derive an electrical output from said transducer, means to apply a portion of said oscillator output to said receiver to deactivate said receiver when said oscillator is oscillating, means to apply the output of said receiver to said pulse producing means to cause it to produce a pulse in response to the reception of an echo pulse, and means coupled to said oscillator output to provide an indication proportional to the number of times said oscillator oscillates per unit of time.

2. A pulsed depth meter system comprising an oscillator, a monostable multivibrator circuit having a stable and an unstable condition, means coupling said multivibrator circuit and said oscillator to prevent said oscillator from oscillating when said multivibrator circuit is in its stable condition and to permit said oscillator to oscillate when said multivibrator circuit is in its unstable condition, an electroacoustic transducer coupled to be driven by an output from said oscillator, a receiver coupled to derive an electrical output from said transducer, means to apply a portion of said oscillator output to said receiver to deactivate said receiver when said oscillator is oscillating, means to apply the output of said receiver to said multivibrator circuit to cause said multivibrator circuit to be transferred to its unstable condition and means coupled to said oscillator output to provide an indication proportional to the number of times said oscillator oscillates per unit of time.

3. A system as recited in claim 2 wherein said oscillator has a tank circuit and said means coupling said multivibrator circuit and said oscillator includes an electron discharge tube in series with said tank circuit, said tube having a control grid connected to said multivibrator circuit to render said tube conductive when said multivibrator circuit is in its stable condition and to render said tube non-conductive when said multivibrator circuit is in its unstable condition.

References Cited in the file of this patent

UNITED STATES PATENTS

| Number | Name | Date |
|---|---|---|
| 1,636,502 | Fessenden | July 19, 1927 |
| 2,333,688 | Shepard | Nov. 9, 1943 |
| 2,428,799 | Hayes et al. | Oct. 14, 1947 |
| 2,495,115 | Mayer | Jan. 17, 1950 |
| 2,530,035 | Watt | Nov. 14, 1950 |
| 2,540,035 | Rodman | Jan. 30, 1951 |
| 2,561,851 | Fryklund | July 24, 1951 |